(No Model.) 2 Sheets—Sheet 1.
C. HAFFCKE.
Baking Apparatus.
No. 228,753. Patented June 15, 1880.
FIG. I.
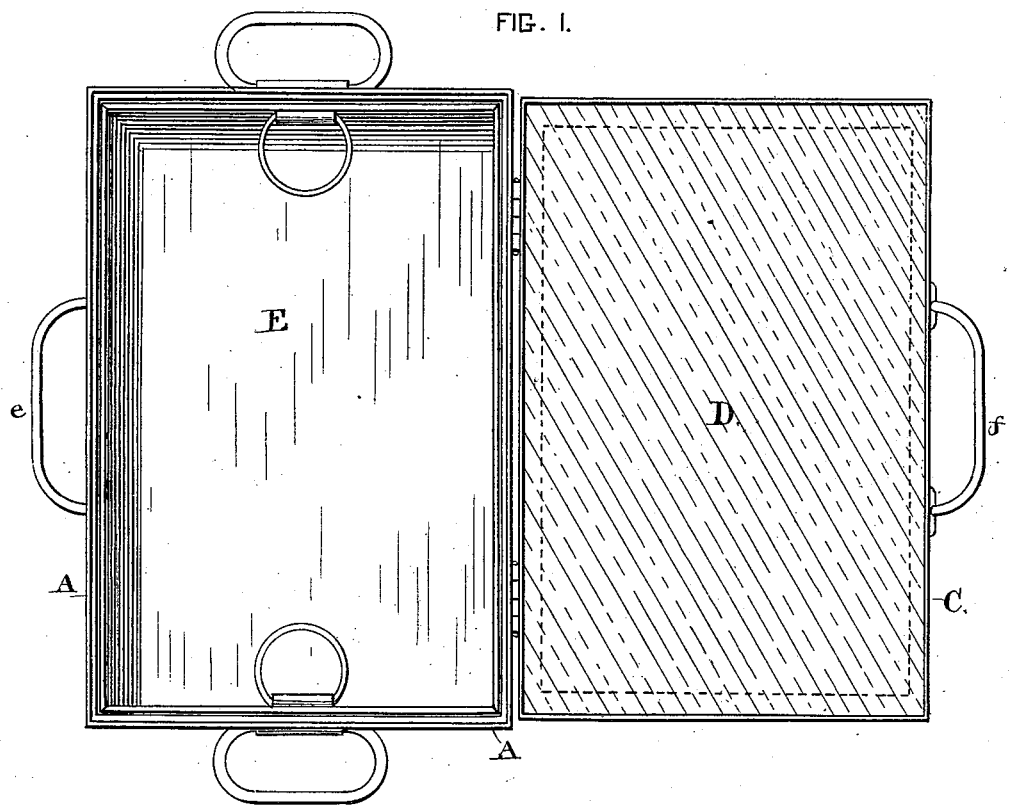
FIG. II.
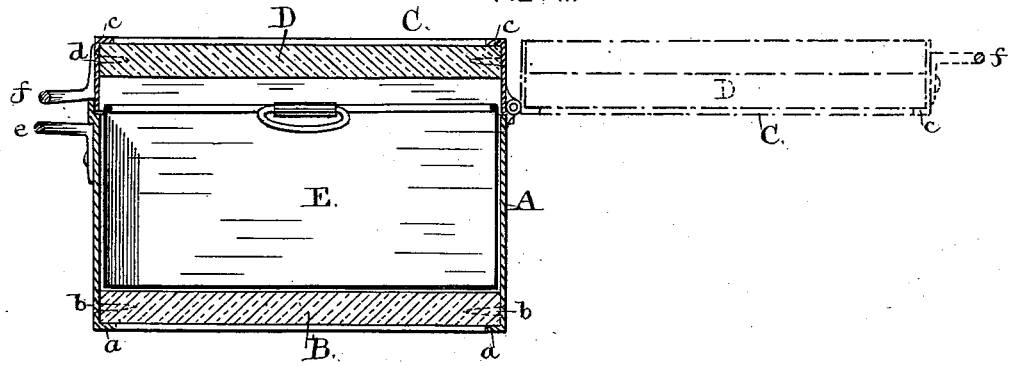
WITNESSES:
E. R. Lewis
A. S. Taylor
INVENTOR:
Charles Haffcke (No Model.)  2 Sheets—Sheet 2.
C. HAFFCKE.
Baking Apparatus.
No. 228,753.  Patented June 15, 1880.
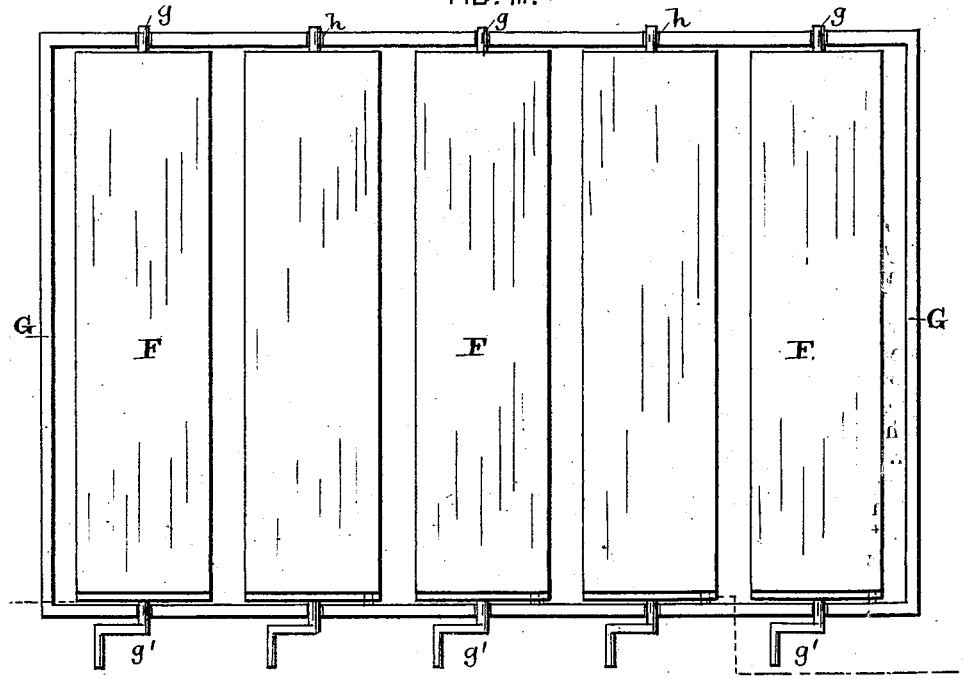
FIG. III.
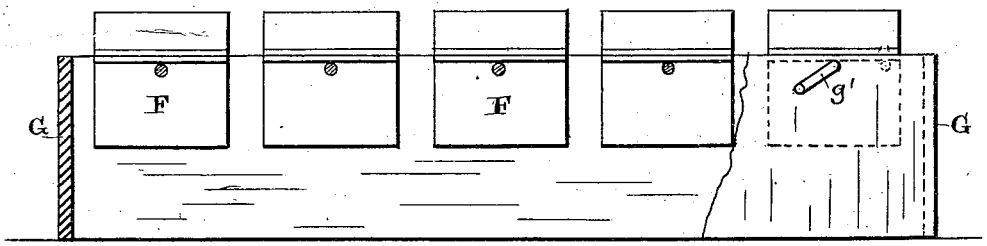
FIG. IV.
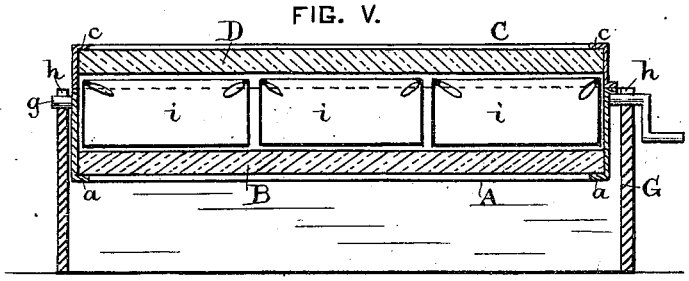
FIG. V.
WITNESSES:  INVENTOR:

UNITED STATES PATENT OFFICE.

CHARLES HAFFCKE, OF NEW YORK, N. Y.

BAKING APPARATUS.

SPECIFICATION forming part of Letters Patent No. 228,753, dated June 15, 1880.

Application filed April 20, 1880. (No model.)

*To all whom it may concern:*

Be it known that I, CHARLES HAFFCKE, a citizen of the United States, residing at New York city, in the county of New York and State of New York, have invented certain new and useful Improvements in Baking Apparatus for Clams, Oysters, Vegetables, &c.; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to baking or roasting apparatus for clams, oysters, vegetables, &c., and the object is to furnish an apparatus in which clams, oysters, vegetables, &c., can be quickly, evenly, and nicely baked or roasted, and without the loss of aroma, juice, or taste; and the invention consists in the construction and arrangement of parts, as will be hereinafter more fully described, reference being had to the accompanying drawings, in which—

Figure I is a plan view of a box or holder having a bottom and top made of soap-stone, with the cover thrown back. Fig. II is a vertical cross-section of the same with the cover closed and in dotted lines open. Fig. III is a plan of a series of holders arranged in a frame for a hotel or restaurant. Fig. IV is a vertical longitudinal section of the same, partly in elevation, the plane of section being indicated by dotted line. Fig. V is a cross-section of the same.

In the drawings, A is a suitable frame, forming a receptacle, and made of cast or sheet iron, provided with a flange, $a$, upon which a soap-stone slab, B, is supported and secured by screws $b$. To the frame is hinged a cover, C, also formed of a frame provided with a flange, $c$, upon which a soap-stone slab, D, is supported and held in place by screws $d$. The frame A and cover C are provided with handles $e f$, by which they can be manipulated.

In the receptacle A is preferably placed a box or holder, E, made of sheet metal, into which the clams, oysters, potatoes, or other vegetables are placed and baked or roasted.

This apparatus is intended to be portable, and may be used while fishing or gunning.

The cover is first placed over the fire, so as to become thoroughly heated, and then the articles are placed in the box E, and it is placed on the fire with the bottom down, when, in a few moments, the articles will be cooked very evenly, and can be removed without losing any juice or aroma.

For hotel purposes, restaurants, boarding-houses, &c., a series of receptacles, F, as shown in Figs. 3 and 4, constructed in a similar manner, are arranged on a frame, G, which may be placed over an open fire, range, or grate. In this case the receptacles are provided with a pin or stud, $g$, which fits into a notch or recess, $h$, in the frame, so that they can be revolved. They are also furnished with a crank-handle, $g'$, to revolve them with.

If desired, the receptacles may be furnished with two or more boxes, $i$, as shown in Fig. 5, instead of one, as said receptacles can be made longer in proportion to the requirements of the hotel, &c.

The great advantages of my apparatus are, that all articles can be quickly baked or roasted. They will retain their aroma and also the juice. They will not receive bad odors of any kind. Any kind of fuel—such as wood, coal, gas, or oil—can be used. It is not liable to get out of order, and, as the soap-stone retains the heat longer than iron, the articles will be done quickly and evenly.

Having thus described my invention, what I claim, and desire to secure by Letters Patent, is—

1. The receptacle for baking and roasting purposes herein described, consisting of a frame, A, provided with flanges $a$, and the cover C, having flanges $c$, for supporting the soap-stone slabs B and D, which are secured by screws $b d$, all constructed and arranged as shown and specified.

2. The combination of the receptacle A and cover C, constructed as herein described, with the box E, arranged as shown, and for the purpose specified.

3. The combination of the frame G, provided with notches $h$, with the receptacles A, having soap-stone slabs B, pins $g$, and crank-handles $g'$, and hinged covers C, having soap-stone slabs D, all constructed and arranged substantially as shown and described.

In testimony whereof I affix my signature in presence of two witnesses.

CHARLES HAFFCKE.

Witnesses:
E. R. LEWIS,
A. S. TAYLOR.